(No Model.)
N. G. WILLIAMS.
CENTRIFUGAL LIQUID SEPARATOR.
No. 549,866. Patented Nov. 12, 1895.
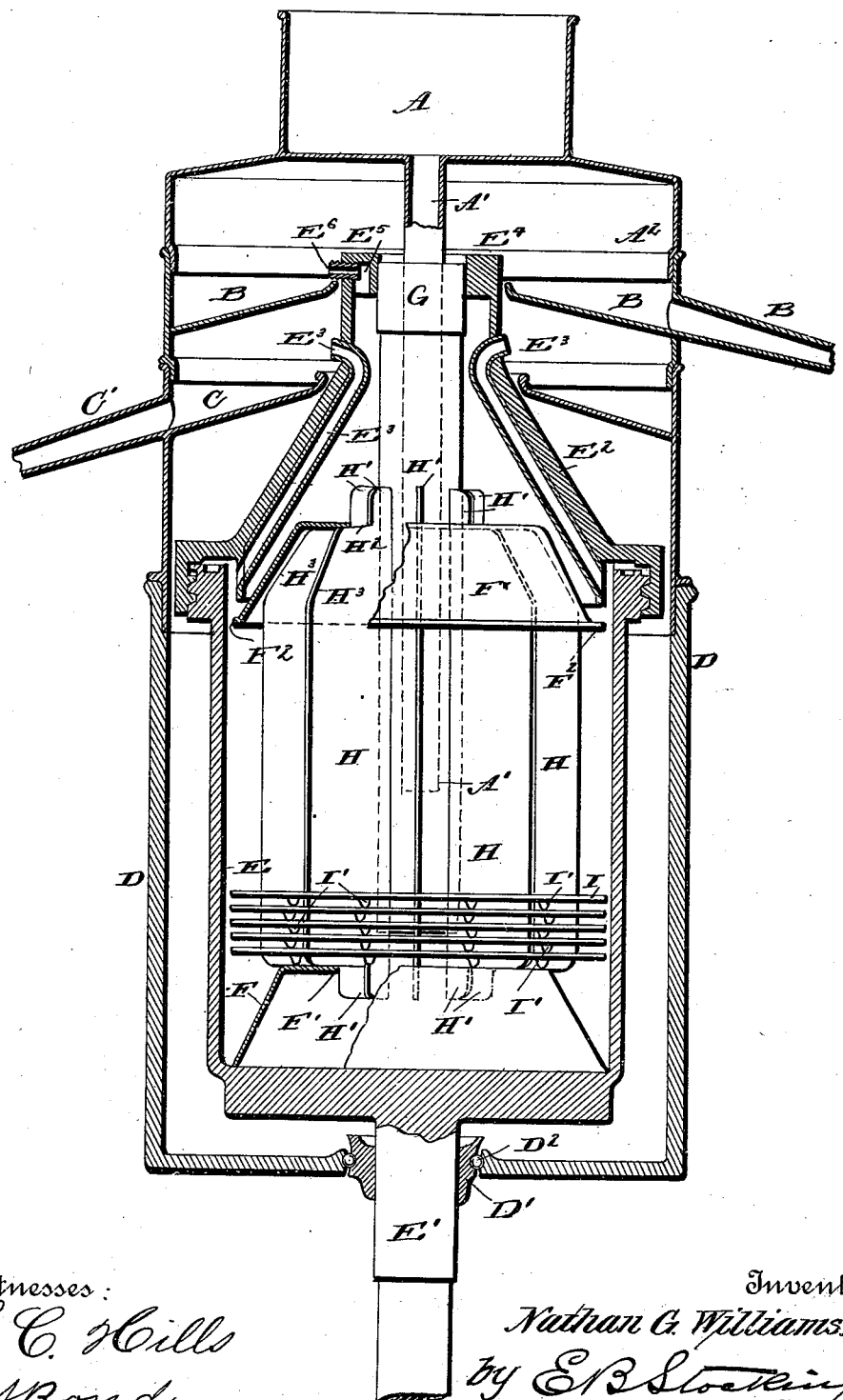
Witnesses:
L. C. Hills
E. H. Bond
Inventor:
Nathan G. Williams.
by E. B. Stocking
Attorney (No Model.) 2 Sheets—Sheet 2.
N. G. WILLIAMS.
CENTRIFUGAL LIQUID SEPARATOR.
No. 549,866. Patented Nov. 12, 1895.
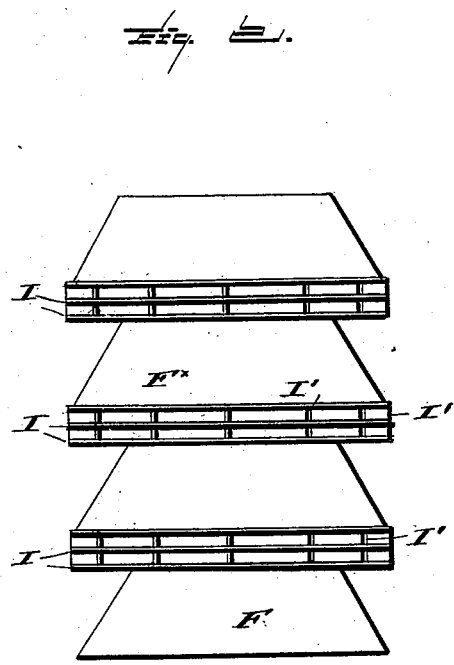
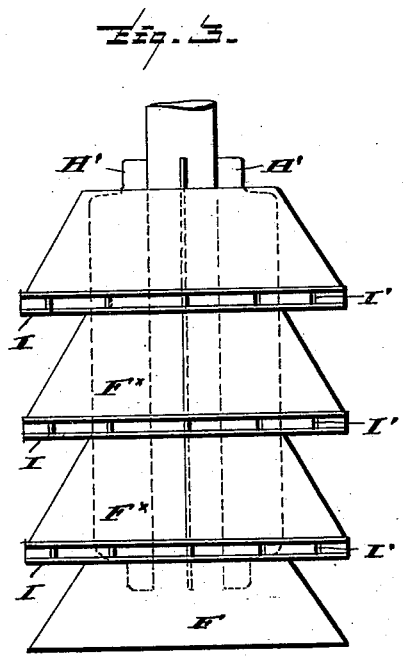
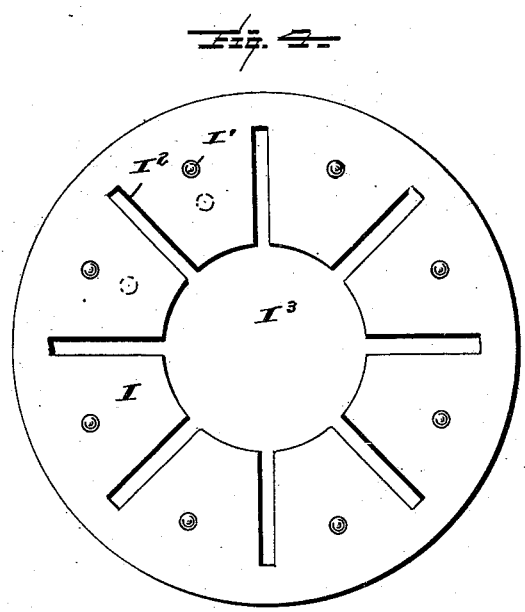
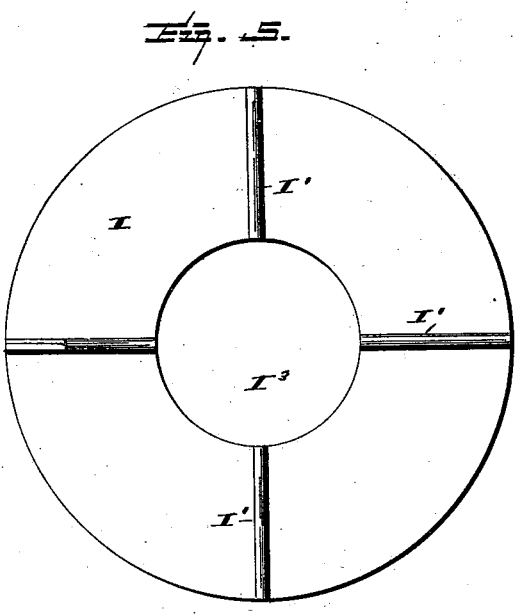
Witnesses
L. C. Hills.
E. H. Bond
Inventor:
Nathan G. Williams.
by E. B. Stocking
Attorney

UNITED STATES PATENT OFFICE.

NATHAN G. WILLIAMS, OF BELLOWS FALLS, VERMONT.

CENTRIFUGAL LIQUID-SEPARATOR.

SPECIFICATION forming part of Letters Patent No. 549,866, dated November 12, 1895.

Application filed April 29, 1893. Serial No. 472,336. (No model.)

*To all whom it may concern:*

Be it known that I, NATHAN G. WILLIAMS, a citizen of the United States, residing at Bellows Falls, in the county of Windham, State of Vermont, have invented certain new and useful Improvements in Centrifugal Liquid-Separators, of which the following is a specification, reference being had therein to the accompanying drawings.

This invention has relation to centrifugal separators, and, although hereinafter described in connection with the separation of cream from milk, the invention is not limited to that particular use, but embraces a use of the same for the separation of a substance into such of its constituent elements as possess different specific gravities. The fundamental principle involved is the well-known operation of centrifugal force generated by a rapid rotary motion, in that the particles having the greatest specific gravity are forced outwardly from the center of rotation, while the lighter particles move inwardly toward the center of rotation.

The construction, operation, results, and advantages of my invention will be set forth in the following description, and the novel features thereof will be particularly pointed out in the claims.

Referring to the drawings, Figure 1 is a central vertical section with portions in elevation of a centrifugal machine embodying my invention. Fig. 2 is a modified arrangement of diaphragm from that illustrated in Fig. 1. Fig. 3 is a view of still another arrangement of diaphragm. Fig. 4 is a plan of one form, and Fig. 5 a plan of another form, of diaphragm.

Like letters refer to like parts in all the figures.

Referring to Fig. 1, A is the supply-tank or receiver for the milk which flows therefrom through the pipe A' and thence downwardly to the bottom of the bowl of the separator. Any usual well-known and suitable float-valve may be employed to regulate the flow of the milk down the pipe A' but such devices being well-known in the art, it is deemed unnecessary to further describe or illustrate the same.

The supply-tank or receiver A is arranged upon the cover $A^2$ of the cream receiving and delivering pan B, provided with a discharge-spout B', and this constitutes the cover of and is mounted upon skimmed-milk pan C, having a discharge spout C, which is mounted upon the casing D of the apparatus. A suitable bearing D' is provided with interposed cushion or packing $D^2$, so that the shaft E' of the bowl E may be given the necessary rotation to generate centrifugal force within the bowl.

$E^2$ represents the cap of the bowl, the connection of the same with the bowl in this instance being by means of screw-threads as shown, and means for the reception of suitable packing between the parts. In this regard any other well-known connection of the bowl and its cap may be adopted.

Within the cap is arranged a suitable number of pipes $E^3$, which communicate at their upper ends with the skimmed-milk pan C, and at their lower ends with the space within the bowl E adjacent to its inner wall and near its top. The extreme upper end of the cap $E^2$ has a central opening $E^4$, for the purpose to be hereinafter mentioned, and at one side of said opening is formed a passage $E^5$, extending partly through the upper end of the cap. In a lateral opening communicating with the passage $E^5$ is screw-threaded or otherwise adjustably arranged a tube $E^6$, whereby said tube may be—in this instance by simply rotating the same—caused to project more or less into the passage $E^5$, the tube communicating with the cream-pan B of the apparatus.

Upon the bottom of the bowl is placed an inverted truncated cone-shaped pan F having a concentric opening F'. Within the opening $E^4$ of the cap $E^2$ of the bowl is arranged a tubular spindle G, which snugly fits the opening, extending axially down into the bowl and to, nearly to, or, it may be, into and through the pan or base-piece.

Radial blades H are arranged adjacent to the spindle G and may be either detachably or fixedly connected thereto, as desired. Each of the blades terminates at both ends in projections H', a horizontal portion $H^2$, and at the top with a slanting outline $H^3$, which may be, as desired, more or less conformed to a top piece or cap $F^\times$, similar to that arranged in the bottom of the bowl. It will be noted, however, that said top piece or cap terminates in an annular flange F², which projects toward and nearly to the inner wall of the bowl.

I I represent a series of diaphragms, which are removably arranged on the inner blades H. These diaphragms are spaced from each other, as shown, and while the spacing may be accomplished by any well-known means I have illustrated a series of depressions or projections forming nibs I', which, as shown in Fig. 1, may all project in one direction, or for the purpose of giving greater contact-surface nibs may be struck up projecting in both directions, as indicated by full and by dotted circles in Fig. 4. The particular location of the nibs may be as desired. In some instances and for some reasons it may be well to locate more or less of the nibs nearer the center of the diaphragm than others, as it will be noted that in some instances the diaphragms are provided with slots I² to permit the blades H to pass through the diaphragms. These slots may be, as desired, of such width as to closely fit the blades or of such width as to permit the passage of liquid on either or both sides of the blades and from one to another of the spaces between the diaphragms. It may be advantageous, also, to make one or more perforations in the diaphragm near the center or between slots and employ these in connection with a more or less tightly-fitting slot at the blade. Such hole or holes may be located about where the dotted circles appear in Fig. 4. The central opening I³ may be substantially of a size to permit the introduction of the diaphragms, one after another, upon the blades, the portions between the slots approaching to a greater or less proximity to the spindle G.

In Fig. 5 the modification in the diaphragm consists in radial nibs or projections, rings or blades I', which serve the functions of spacers and of the blades, in that they divide the spaces between the diaphragms into compartments. Whatever form of spacing device is provided for the horizontal diaphragms, I prefer that they should not in any case project inwardly beyond the edge of the opening in the diaphragm, as they will interfere with the presence of the tube O. I therefore locate the spacing devices within the edges of the diaphragms.

In the form shown in Fig. 1 the interior of the bowl is, by means of the blades and diaphragms, divided into numerous compartments horizontally and radially disposed, and if desired the parts constituting the walls of the compartments may be either in a fixed or movable relation with each other, the latter being preferable, as it adapts the parts for a ready separation for cleaning purposes. In fact, this is almost altogether preferable; but should the parts be secured fixedly together they could be cleaned by the use of any well-known steam cleaning apparatus.

It is understood, as a matter of course, that the entire interior of the bowl E may contain a continuous series of diaphragms extending from the base-piece F to the cap-piece F$^\times$, and this series may consist entirely of horizontal diaphragms; but I find it convenient to interpose one or more caps F$^\times$ between sets of one or more diaphragms, as clearly shown in Fig. 2. I have found that equally as good results are obtained by having but one horizontal diaphragm and one truncated conical part or one horizontal diaphragm or part between each truncated conical part or cap, as shown in Fig. 2. Of course in this construction the vertical rotary blades are present, as indicated by dotted lines in said Fig. 3. Various other modified arrangements involving separated series of diaphragms may be employed, and for this reason, also, it would appear to be preferable to have the caps and diaphragms at least separably arranged or connected with the blades, whether the blades be removably attached to the spindle or not. The diameters of the diaphragms and of the caps, with their edges slotted or not, including the base-piece, may be such that all or either of them may more or less snugly fit the interior of the bowl in order to maintain the parts centrally therein. Of course it is not therefore essential that the diaphragms and caps should be of such diameter.

In this description I have used the term "cap" to indicate a cone-shaped pan, with or without the flange F², the purpose, as hereinafter more fully described, being to facilitate an upward movement bodily of the liquid in the bowl, so that while perhaps, strictly speaking, such cone-shaped pans are caps only when they surmount other devices and bases only when they are arranged below the remaining devices, still wherever located their inclined peripheries facilitate a movement bodily when compared to a horizontal diaphragm, and for this reason they may be distributed with relation to the diaphragms, in accordance with the desire of the operator, the character of the liquid operated upon, or the result to be obtained.

Various modifications in detail and touching the construction and arrangement of the parts contained within the bowl will suggest themselves to persons skilled in the construction and use of this class of machinery; but my invention is not limited in these regards, as the forms illustrated are but illustrations of an embodiment of the invention.

The operation of the apparatus is substantially as follows: The milk or other liquid being suitably supplied to the receiver A, passes through the pipe A' into the bottom piece and onto the bottom of the bowl, fills said piece and flows through the opening F' and between the blades H upwardly upon the first diaphragm and thence by centrifugal force generated by a rapid rotation of the bowl outwardly in the space between the two diaphragms and two blades, so continuing through the series of diaphragms until the bowl is full. The heavier particles of the liquid are, as a matter of course, thrown outwardly to the wall of the bowl, and if milk be the liquid the heavier particles—that is, the skimmed milk—pass upwardly through and out of the pipes E³ into the skimmed-milk pan C and from thence out of the delivery-spout C' into any suitable receptacle. The lighter particles of the liquid—being in milk the cream—are carried upwardly after being forced toward the center through the opening F' of the cap and between the blades and from thence upwardly along the inner wall of the cap or along the cream-line, which, it is well known, is in the form of a concentric wall in every separator, until the cream reaches the top of the cap. Now, this is closed against the passage of the cream at all points except the passage E⁵, into which the cream flows, and from thence through the pipe E⁶ into the cream-pan B and through its spout B' into a suitable receptacle. By adjusting the pipe E⁶ inwardly the flow of the cream is impeded by the body of the screw, thereby enriching its quality. An opposite adjustment of the pipe E⁶ has an opposite effect. Between each pair of diaphragms is an inward current and an outward current, in that the heavier particles or constituents under the influence of centrifugal force move from the center outwardly, while the lighter constituents move in an opposite direction. As the general movement of the liquid through the bowl is from the bottom upward, it may be assumed that the current of heavier constituents is located along the under side of the diaphragm, while the current of lighter constituents is located along the top of each diaphragm; but as to this exact location of the currents it may be said to be more or less theoretical; but it is certain, however, that opposite currents do exist. Now, by dividing the bowl into numerous horizontal spaces, in each of which the operation of separation of constituents takes place, rapidity in accomplishing the result desired is secured. The radial division accomplished by the blades furnishes another aid, in that it provides vertical limits in the horizontal compartments formed by the diaphragms, and these radial compartments are broader in area from the center outwardly in a proportion which more or less agrees with the extent and effect of the centrifugal force.

I have found by experiment that there are advantages in the employment of horizontal diaphragms, which are enhanced by the simultaneous employment of means for separating the diaphragms into several series.

The upward pressure of the liquid in a centrifugal bowl—i. e., of the body of liquid therein, taken as a whole—is greater than would ordinarily be supposed, and while it may not be sufficiently great to entirely overcome the centrifugal force it may, and probably does, interfere with its effectiveness. On the other hand, while a complete series of horizontal partitions offers less resistance to the operation of the centrifugal force, still they may impede to a greater or less extent the passage of the liquid through the bowl and therefore retard somewhat the process of separating that liquid into its constituents. I mean by this that the separation of a given quantity of liquid and the delivery of the separated constituents may be retarded by the use solely of a continuous series of horizontal diaphragms. I therefore have devised the arrangement of diaphragms and caps which is illustrated in Fig. 2 as being, on the whole, quite advantageous, for the reasons above stated. The arrangement consists in interposing caps F× between a series of diaphragms I. In this arrangement the inward and outward currents exist between the diaphragms I in fine layers of the liquid, while between the caps the layers of liquid are of comparatively greater depth and the upward passage of the liquid is more in the nature of a bodily movement thereof, while there is a simultaneous effective operation of centrifugal force to overcome any imperfections in the separation of the constituents which may have occurred in a preceding series of horizontal diaphragms. The results attained in an operation of a machine embodying either of the arrangements which I have shown and described are substantially equal in advantage as to time and quality, so that one arrangement is substantially as good as the other, and while there are less diaphragms to be cleaned in the construction and arrangement shown in Fig. 2 than in that of Fig. 1 there are more caps to be cleaned, so that in this respect there is still substantial equality of advantage in both constructions. The inclined circumferential walls of each of the caps may offer a slight resistance to an upward movement of the liquid as a body; but this objection is not material, as the caps are separated so far from each other that the liquid as a body is not confined in small spaces by the caps, as would be the case if they were placed one directly upon the other. I therefore prefer to secure a fine subdivision of the interior of the bowl by horizontal compartments and to provide for a bodily movement of the liquid through the bowl at portions thereof occupied by truncated cone-like caps and base-pieces. Of course if the machine be of that class where the liquid is fed at the top and discharge-openings are provided at the bottom an inversion of the truncated-cone caps might be advantageous. So, too, as above and hereinbefore indicated, various changes may be made in the construction and arrangement of the several parts employed without involving a departure from that which my invention contemplates.

What I claim is—

1. As an element of a centrifugal machine and as a means for controlling the radial and the axial flow of liquids and their constituents, a series of horizontal diaphragms and conical caps arranged within the bowl, substantially as described.

2. As an element of a centrifugal machine and as a means for controlling the radial and the axial flow of liquids and their constituent elements, a series of horizontal diaphragms and interposed conical caps, substantially as described.

3. In a centrifugal machine a series of horizontal or plain diaphragms having slots and a series of vertical blades arranged in the slots of the diaphragms, substantially as described.

4. In a centrifugal machine a series of plain annular slotted diaphragms having spacing devices vertical blades and a truncated conical base piece adapted to support the blades and lower diaphragm of the series, substantially as described.

5. The combination with the bowl of a centrifugal machine, of an arrangement of closely assembled horizontal diaphragms, conical caps independent of the diaphragms within the bowl, means for retaining these devices centrally within the bowl, and suitable means for supplying milk to the bowl, substantially as described.

6. In a centrifugal machine, the combination with a bowl, of a central tube, horizontal diaphragms and truncated cones each independent of the other and arranged within said bowl, substantially as described.

7. In a centrifugal machine the combination with the bowl, of a central tube, horizontal diaphragms and interposed truncated conical caps each independent of the other and arranged within said bowl, substantially as described.

In testimony whereof I affix my signature in presence of two witnesses.

NATHAN G. WILLIAMS.

Witnesses:
    FRANK G. DAY,
    A. J. HOLLEY.